US009822884B2

(12) United States Patent
Miyake et al.

(10) Patent No.: US 9,822,884 B2
(45) Date of Patent: Nov. 21, 2017

(54) VALVE DEVICE AND POPPET

(71) Applicants: JTEKT Corporation, Osaka-shi (JP); Toyota Jidosha Kabushiki Kaisha, Toyota-shi (JP)

(72) Inventors: Junya Miyake, Toyota (JP); Koji Nishi, Anjo (JP); Kazuhisa Sugiyama, Okazaki (JP); Takumi Mio, Kariya (JP); Sachiko Kubota, Nagoya (JP); Eiji Okawachi, Toyota (JP); Akira Yamashita, Toyota (JP); Naohiro Takeshita, Toyota (JP)

(73) Assignees: JTEKT CORPORATION, Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/138,686

(22) Filed: Apr. 26, 2016

(65) Prior Publication Data
US 2016/0312902 A1 Oct. 27, 2016

(30) Foreign Application Priority Data
Apr. 27, 2015 (JP) ................................. 2015-090472

(51) Int. Cl.
*F16K 1/38* (2006.01)
*F17C 13/04* (2006.01)
(Continued)

(52) U.S. Cl.
CPC ............ *F16K 1/385* (2013.01); *F16K 15/025* (2013.01); *F16K 25/00* (2013.01); *F16K 29/00* (2013.01);
(Continued)

(58) Field of Classification Search
CPC ...................................................... F16K 1/385
(Continued)

(56) References Cited

U.S. PATENT DOCUMENTS 1,555,068 A * 9/1925 Nixon ..................... F16K 15/04
137/331
1,830,407 A 11/1931 Prenveille
(Continued)

FOREIGN PATENT DOCUMENTS

| DE | 10 2010 003192 A1 | 9/2011 |
| GB | 565 291 A | 11/1944 |
| JP | 2013-29161 | 2/2013 |

OTHER PUBLICATIONS

Extended European Search Report dated Sep. 5, 2016 Application No. 16166809.0.

*Primary Examiner* — Craig Schneider
*Assistant Examiner* — Nicole Gardner
(74) *Attorney, Agent, or Firm* — Oblon, McClelland, Maier & Neustadt, L.L.P.

(57) ABSTRACT

A valve device includes: a poppet that is formed in a hollow shaft shape except for a leading end, has a tapered closure part at the leading end and a side hole passing through a wall of the hollow shaft-shaped part, and rotates around a shaft center thereof during opening and closing actions; and a valve seat having a sloped seat surface with which the closure part of the poppet comes into contact when closing the valve device. The closure part of the poppet or the seat surface of the valve seat, whichever has a higher hardness, has a cut mark of the opposite direction from a direction of rotation of the poppet around the shaft center that occurs during the valve closing action.

8 Claims, 10 Drawing Sheets

(51) Int. Cl.
  *F16K 15/02* (2006.01)
  *F16K 25/00* (2006.01)
  *F16K 29/00* (2006.01)
  *B60K 15/03* (2006.01)
  *B60L 11/18* (2006.01)

(52) U.S. Cl.
  CPC .... *F17C 13/04* (2013.01); *B60K 2015/03026* (2013.01); *B60K 2015/03315* (2013.01); *B60L 11/1881* (2013.01)

(58) Field of Classification Search
  USPC .......................................................... 137/332
  See application file for complete search history.

(56) References Cited

U.S. PATENT DOCUMENTS

| | | | | |
|---|---|---|---|---|
| 2,295,154 A * | 9/1942 | Brower | ................ | F16K 17/383 137/536 |
| 2,510,489 A * | 6/1950 | Winchester | ........... | F04B 53/129 137/533.19 |
| 2,516,795 A * | 7/1950 | Norton | ................ | F01L 1/32 123/90.3 |
| 2,755,816 A * | 7/1956 | Collins | ................ | F16K 15/063 137/496 |
| 2,959,188 A * | 11/1960 | Kepner | ................ | F16K 15/026 137/539 |
| 3,822,970 A * | 7/1974 | Smith | ................ | F04B 53/129 417/552 |
| 4,213,021 A | 7/1980 | Alexander | | |
| 6,431,521 B1 * | 8/2002 | Jones | ................ | F16K 1/38 251/319 |
| 7,290,562 B2 * | 11/2007 | Kane | ................ | F16K 15/026 137/538 |
| 2005/0016597 A1 | 1/2005 | Hope et al. | | |
| 2011/0236190 A1 * | 9/2011 | Chiu | ................ | F01D 5/087 415/177 |
| 2012/0100004 A1 * | 4/2012 | McClellan | ............. | F03B 13/08 416/241 R |
| 2016/0102771 A1 * | 4/2016 | Kuroyanagi | ............. | F17C 13/04 137/540 |
| 2016/0116918 A1 * | 4/2016 | Nakamura | ............. | G05D 7/00 137/544 |
| 2016/0312902 A1 * | 10/2016 | Miyake | ................ | F17C 13/04 |

* cited by examiner

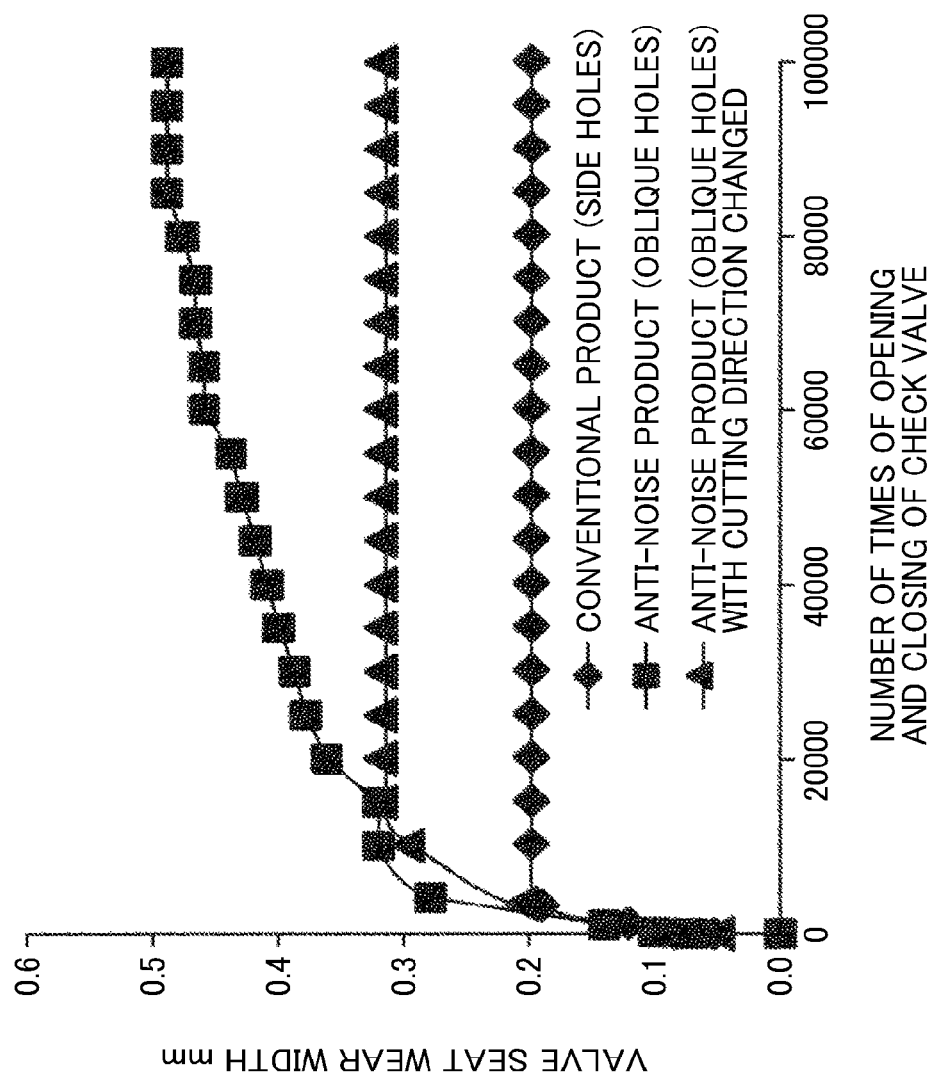

VALVE DEVICE AND POPPET

INCORPORATION BY REFERENCE

The disclosure of Japanese Patent Application No. 2015-090472 filed on Apr. 27, 2015 including the specification, drawings and abstract is incorporated herein by reference in its entirety.

BACKGROUND OF THE INVENTION

1. Field of the Invention

The present invention relates to a valve device and a poppet.

2. Description of Related Art

Conventionally, a gas tank installed in a fuel cell vehicle etc. is provided with a valve device that controls the supply and exhaust of high-pressure hydrogen gas stored inside the tank. Such a valve device includes a body with a gas flow channel formed therein that provides communication between the inside and the outside of the gas tank, and a valve mechanism that controls the flow of hydrogen gas through the gas flow channel. A pipe extending from an external apparatus (e.g., hydrogen gas supply source) is coupled to the gas flow channel through a joint mounted on the body (e.g., Japanese Patent Application Publication No. 2013-29161).

Specifically, as shown in FIG. 9, a body 121 of the valve device described in JP 2013-29161 A has a mounting hole 123 on which a joint 122 is mounted. The body 121 further has a filling channel 124 that communicates with the mounting hole 123 at the bottom surface of the mounting hole 123 and serves as a gas flow channel through which the gas tank is filled with hydrogen gas. As a pipe (not shown) is coupled to the joint 122, the pipe is connected to the filling channel 124.

The filling channel 124 is provided with a check valve 132 that prevents hydrogen gas from being released through the mounting hole 123 to the outside. At the end on the side of the mounting hole 123, the filling channel 124 has an enlarged part 133 communicating with the mounting hole 123 and a valve housing part 134 adjacent to the enlarged part 133. The inner diameter of the valve housing part 134 is smaller than that of the enlarged part 133 and larger than that of the other part of the filling channel 124. The check valve 132 includes a valve seat 136 with a valve port 135 formed at the center, a poppet 137 that can open and close the valve port 135 (filling channel 124) by coming into and out of contact with the valve seat 136, and an urging member 138 that urges the poppet 137 toward the valve seat 136.

When the tank is not being filled with hydrogen gas, the poppet 137 remains in close contact with the valve seat 136 under the pressure of hydrogen gas stored inside the tank and the spring load of the urging member 138 to thereby keep the valve port 135 closed and prevent the hydrogen gas from being released through the filling channel 124.

To fill the tank with hydrogen gas, the check valve is opened by pushing the poppet 137 downward under the load of the hydrogen gas. Since this filling process utilizes the differential pressure between the filling pressure and the tank internal pressure, the gas flow rate decreases as the differential pressure decreases.

As hydrogen gas tanks in recent years are designed for increasingly higher pressure (e.g., 70 MPa) to increase the hydrogen storage capacity, higher reliability is required of check valves. As shown in FIG. 10, the check valve includes a closure part 141 that comes into and out of contact with the valve seat 136 at the leading end, and the part of the check valve except the leading end includes a portion 140 and is formed in a cylindrical shape with an inner cavity 143. The check valve further has a plurality of hydrogen passage holes 142 (i.e., side holes) at a right angle to the inner cavity 143 (i.e., the shaft center of the check valve).

When the inside of the hydrogen gas tank is brought to high pressure, this type of valve body experiences a noise phenomenon as hydrogen gas passes through the hydrogen passage holes 142. One solution to reduce the noise is to form side holes 144 that are oblique to the shaft center of the check valve as shown in FIG. 11 and FIG. 12, instead of forming the hydrogen passage holes 142 at a right angle to the shaft center of the check valve. In this case, however, a problem with the durability of the check valve may arise in return for being able to suppress the noise. Specifically, a phenomenon has been found that the seat surface of the valve seat wears abnormally as the valve body rotates around the shaft center thereof (on its own axis) during the valve closing action.

Although the above is the example where the side holes 144 are oblique to the inner cavity 143, a similar problem with the durability of the valve device arises when the valve body itself rotates around the shaft center thereof (on its own axis), even if the side holes are not oblique to the inner cavity, i.e., even if the side holes are formed at a right angle to the shaft center of the valve body.

SUMMARY OF THE INVENTION

The present invention provides a valve device of which the durability can be secured even when the poppet rotates around the shaft center. The present invention also provides a poppet that allows the durability of the valve device to be secured even when the poppet rotates around the shaft center thereof.

A first aspect of the present invention is a valve device including: a poppet that is formed in a hollow shaft shape except for a leading end, has a tapered closure part at the leading end and a side hole passing through a wall of the hollow shaft-shaped part, and rotates around the shaft center thereof when opening and closing the valve device; and a valve seat having a sloped seat surface with which the closure part of the poppet comes into contact during a valve closing action. The closure part of the poppet or the seat surface of the valve seat, whichever has a higher hardness, has a cut mark of the opposite direction from the direction of rotation of the poppet around the shaft center that occurs during the valve closing action.

Owing to the configuration, even when the poppet rotates around the shaft center thereof, the cut mark of the opposite direction from the rotation direction comes into contact with the seat surface of the valve seat. Thus, the wear of the seat surface of the valve seat having a lower hardness is reduced, and the durability of the valve device can be secured.

The side hole may be either a right side hole perpendicular to the shaft center or an oblique hole oblique to the shaft center. Owing to the configuration, whether the poppet has a side hole that is a right side hole perpendicular to the shaft center of the poppet or an oblique hole oblique thereto, the wear of one of the closure part of the poppet and the seat surface of the valve seat having a lower hardness is reduced, and the durability of the valve device can be secured.

The poppet may have the two side holes, and may be configured such that a force couple is exerted by a fluid flowing through the two side holes. Owing to the configuration, even when the poppet is configured such that a force couple is exerted by a fluid flowing through the two side holes, the wear of one of the closure part of the poppet and the seat surface of the valve seat having a lower hardness is reduced, and the durability of the valve device can be secured.

A second aspect of the present invention is a poppet that is formed in a hollow shaft shape except for a leading end, has a tapered surface at the leading end and a side hole passing through a wall of the hollow shaft-shaped part, and rotates around the shaft center thereof when there is a fluid flowing through the side hole. The poppet has, in the tapered surface, a cut mark of the opposite direction from the direction of rotation of the poppet around the shaft center that occurs when the poppet moves in the direction toward the leading end.

Owing to the configuration, even when the poppet rotates around the shaft center thereof, the cut mark of the opposite direction from the rotation direction comes into contact with the seat surface of the valve seat. Thus, the wear of the seat surface of the valve seat having a lower hardness is reduced, and the durability of the valve device can be secured.

In the poppet, the side hole may be formed obliquely to the shaft center, or may be a right side hole perpendicular to the shaft center. Owing to the configuration, when the poppet has a side hole that is a right side hole perpendicular to the shaft center of the poppet or an oblique hole oblique thereto, the wear of the seat surface of the valve seat having a lower hardness is reduced, and the durability of the valve device can be secured.

The poppet may have the two side holes formed therein, and may be configured such that a force couple is exerted by a fluid flowing through the two side holes. Owing to the configuration, when the poppet has the two side holes formed therein and a force couple is exerted by a fluid flowing through the two side holes, the wear of the seat surface of the valve seat having a lower hardness is reduced, and the durability of the valve device can be secured.

According to the aspects of the present invention, an effect is achieved that the durability of the valve device can be secured even when the poppet rotates around the shaft center thereof.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a characteristic diagram showing the relation between the number of times of opening and closing of the check valve and a valve seat wear width;

DETAILED DESCRIPTION OF EMBODIMENTS

Figure 1:
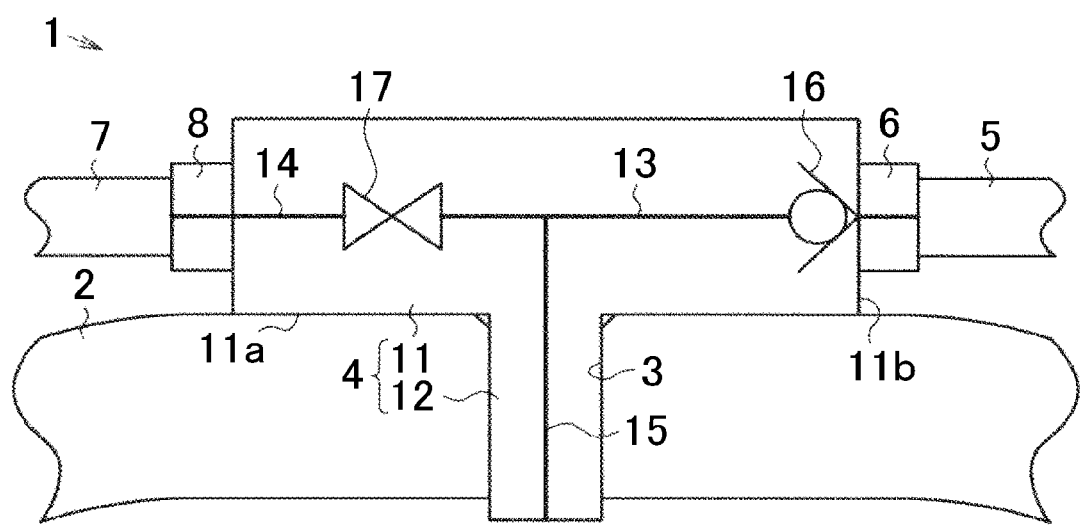
FIG. 1 is a schematic configuration diagram of a valve device.

In the following, one embodiment of a valve device will be described in accordance with the drawings. A valve device 1 shown in FIG. 1 is mounted on a mounting port 3 of a gas tank 2 in which high-pressure (e.g., 70 MPa) hydrogen gas is stored. The valve device 1 includes an aluminum-alloy body 4 (valve main body), a supply-side joint 6 serving as a joint through which a supply pipe (pipe) 5 extending from a hydrogen gas supply source is connected to the body 4, and a delivery-side joint 8 through which a delivery pipe 7 extending to a delivery destination, such as a fuel cell, is connected to the body 4. The body 4 has a flat box-shaped main body 11 disposed on the outside of the gas tank 2, and a mounting part 12 inserted into the mounting port 3. The mounting part 12 is formed in a columnar shape extending in a direction substantially perpendicular to a bottom surface 11a of the main body 11 (extending downward from the center in FIG. 1).

The main body 11 has formed therein a filling channel 13 through which the gas tank 2 is filled with hydrogen gas flowing in from the supply pipe 5, and a delivery channel 14 through which the hydrogen gas is delivered via the delivery pipe 7 to a delivery destination such as the fuel cell. A connection channel 15 that is connected to each of the filling channel 13 and the delivery channel 14 and open to the inside of the gas tank 2 is formed in the mounting part 12. That is, in this embodiment, the filling channel 13 and the connection channel 15 constitute a gas flow channel that provides communication between the inside and the outside of the gas tank 2. The filling channel 13 is provided with a check valve 16 that prevents hydrogen gas filling the gas tank 2 from being released to the outside of the body 4 (valve device 1), and the delivery channel 14 is provided with a solenoid operated valve 17 that controls the supply of hydrogen gas to the delivery destination. In the valve device 1, as the supply pipe 5 is coupled to the supply-side joint 6, the supply pipe 5 is connected to the filling channel 13, and as the delivery pipe 7 is coupled to the delivery-side joint 8, the delivery pipe 7 is connected to the delivery channel 14.

Figure 2:
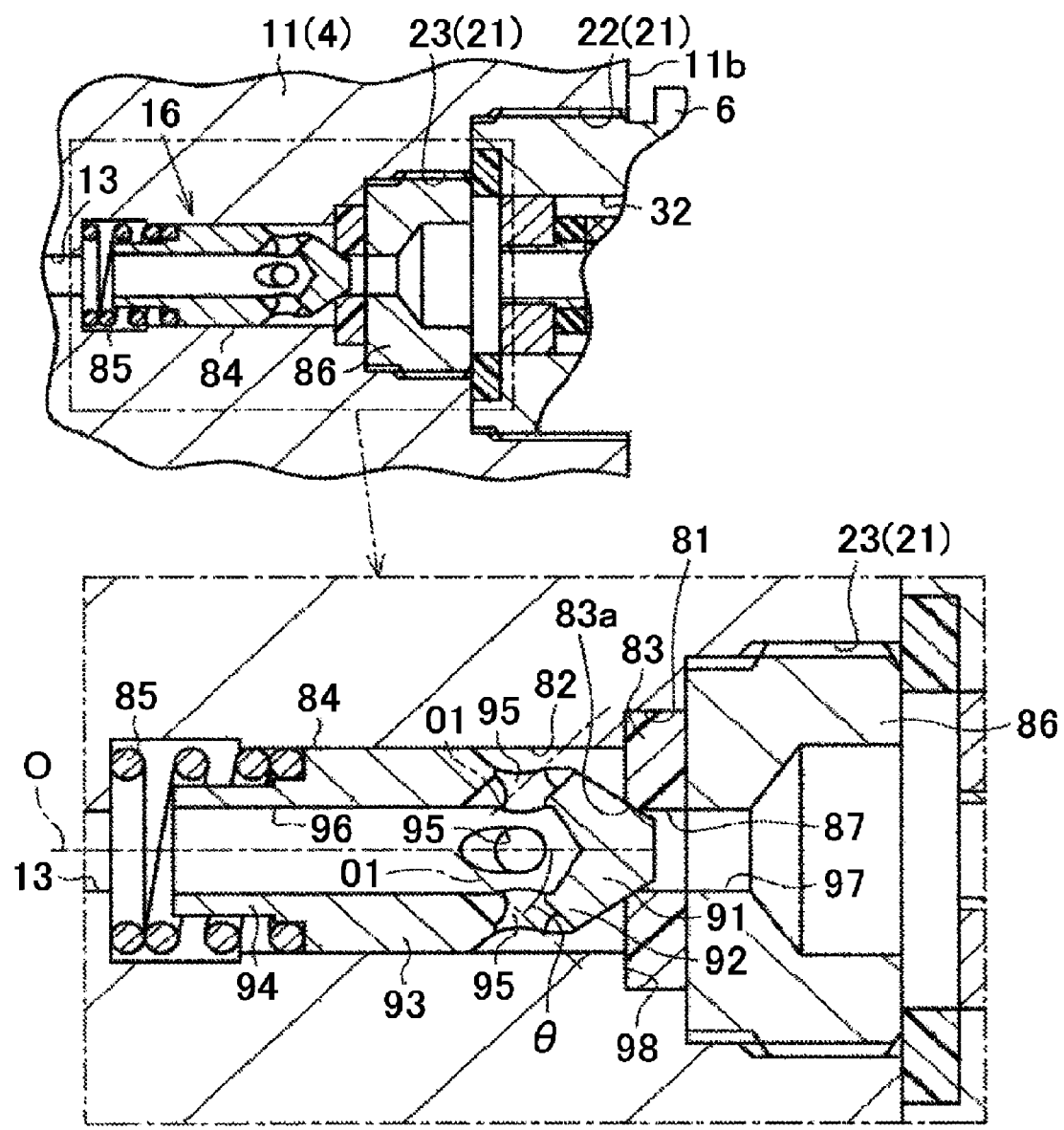
FIG. 2 is a partial sectional view showing a coupling part between a body and a supply-side joint in one embodiment.

Next, the configuration of the coupling part between the body 4 and the supply-side joint 6 and of the vicinity thereof will be described. As shown in FIG. 2, a side surface 11b, i.e., an outer surface, of the main body 11 has a circular mounting hole 21 that extends in a direction substantially perpendicular to the side surface 11b (the left-right direction in FIG. 2). The mounting hole 21 has a first mounting hole 22 open on the side of the side surface 11b and a second mounting hole 23 coaxially adjacent to the first mounting hole 22. The inner diameter of the first mounting hole 22 is larger than the inner diameter of the second mounting hole 23. A female thread is formed in an inner peripheral surface of each of the first mounting hole 22 and the second mounting hole 23. The supply-side joint 6 is mounted on the first mounting hole 22 by being screwed thereto. A positioning member 86 to be described later is mounted on the second mounting hole 23 by being screwed thereto.

In the vicinity of the side surface 11b of the main body 11, the filling channel 13 is formed in a linear shape extending coaxially with the first mounting hole 22 and the second mounting hole 23. The mounting hole 21 communicates with the filling channel 13 through an opening provided in a bottom surface of the second mounting hole 23. The filling channel 13 is provided with the check valve 16.

First, the configuration of the supply-side joint 6 will be described. The supply-side joint 6 has a cylindrical shape, and is configured with a throttle valve etc. (not shown) disposed inside a through-hole 32 that passes through the supply-side joint 6 in the axial direction. The through-hole 32 is formed so as to be coaxial with the filling channel 13 when the supply-side joint 6 is mounted on the first mounting hole 22. One end of the supply-side joint 6 is screwed to the first mounting hole 22, and the supply pipe 5 is screwed to the other end (not shown).

Next, the configuration of the check valve will be described in detail. As shown in FIG. 2, at the end of the filling channel 13 on the side of the mounting hole 21, an enlarged part 81 communicating with the second mounting hole 23 through the opening provided in the bottom surface of the second mounting hole 23, and a valve housing part 82 that is adjacent to the enlarged part 81 and houses the check valve 16 are formed. The inner diameter of the valve housing part 82 is smaller than that of the enlarged part 81 and larger than that of the filling channel 13. An inner peripheral surface of the valve housing part 82 is anodized.

The check valve 16 includes a check valve seat 83 that is an example of the valve seat, a poppet 84 provided so as to be able to come into and out of contact with the check valve seat 83, and an urging member 85, such as a coil spring, that urges the poppet 84 toward the check valve seat 83. The check valve 16 of this embodiment further includes the positioning member 86 that defines the position of the check valve seat 83 in the filling channel 13, i.e., the gas flow channel. The check valve seat 83 is formed of an elastic material, such as a polyimide resin, into an annular shape, and fitted in the enlarged part 81. The material of the check valve seat 83 has a lower hardness than the material of the poppet 84. A check valve port 87 passing through the check valve seat 83 in the axial direction is formed at the center of the check valve seat 83. The check valve port 87 is formed so as to be disposed coaxially with the filling channel 13 when the check valve seat 83 is fitted in the enlarged part 81. The poppet 84 is formed of stainless steel, and provided with a closure part 91 at the leading end, a small-diameter tubular part 92, a large-diameter tubular part 93, and a support part 94 in this order from the side of the check valve seat 83 (the right side in FIG. 2). The closure part 91 has a tapered surface that tapers from the small-diameter tubular part 92 toward the leading end. The tapered surface has a cut mark of the opposite direction from a direction in which the poppet 84 rotates around the shaft center thereof (on its own axis) during a valve closing action, i.e., when the valve shifts from the open state to the closed state. Reasons for the rotation of the poppet 84 and a method for forming the cut mark will be described later.

When combined, the small-diameter tubular part 92, the large-diameter tubular part 93, and the support part 94 have a hollow shaft shape as a whole so as to form a cylindrical shape, and have an inner cavity 96 extending along a central axis O. The outer diameter of the closure part 91 at the largest portion is shorter than the inner diameter of the valve housing part 82 and longer than the inner diameter of the check valve port 87 of the check valve seat 83. The outer diameter of the closure part 91 at the smallest portion is shorter than the inner diameter of the check valve port 87. The poppet 84 closes the check valve port 87 (closes the valve) by seating itself on a sloped seat surface 83a provided in the check valve seat 83 (see FIG. 6B) with the leading end of the closure part 91 inserted into the check valve port 87, and opens the check valve port 87 (opens the valve) by separating itself from the check valve seat 83. That is, the filling channel 13 (gas flow channel) is opened and closed as the poppet 84 comes into and out of contact with the check valve seat 83.

The outer diameter of the small-diameter tubular part 92 is shorter than the inner diameter of the valve housing part 82. The small-diameter tubular part 92 has a plurality of side holes 95 passing through the wall of the small-diameter tubular part 92. Of the side holes 95, a hole perpendicular to the central axis (axis) O of the poppet 84 is bored first, and oblique holes that intersect with the perpendicular hole and incline toward the closure part 91 are bored by subsequent processing. That is, thus processed, the side holes 95 are formed obliquely to the central axis O of the poppet 84 so as to extend along the direction in which the poppet 84 moves during the valve opening action and in which the gas flows. The side holes 95 function as oblique holes that are oblique to the central axis O (i.e., the shaft center of the poppet 84). In other words, the oblique holes (side holes 95) are composed of a first hole perpendicular to the shaft center and second oblique holes that intersect with the first hole and incline toward the closure part 91 (leading end) while extending toward the outer periphery of the poppet 84. Reference sign O1 in FIG. 2 denotes the central axes of the oblique holes formed by the subsequent processing. It is preferable that in this subsequent processing the oblique holes be formed such that the central axes O1 thereof intersect with the central axis O. An angle θ at which the central axes O1 of the oblique holes intersect with the central axis O is 40°, for example, but the angle is not limited to this value. The angle of intersection θ should be within the range of 0°<θ<90°, and is preferably within the range of 20°≤θ≤60°.

The outer diameter of the large-diameter tubular part 93 is substantially equal to the inner diameter of the valve housing part 82 so that the large-diameter tubular part 93 comes into sliding contact with the valve housing part 82. The outer diameter of the support part 94 is slightly shorter than the outer diameter of the large-diameter tubular part 93. The urging member 85 is fitted on the outer periphery of the support part 94 of the poppet 84 with one end and the other end thereof respectively engaged on a bottom surface of the valve housing part 82 and on an end face of the large-diameter tubular part 93, and is housed inside the valve housing part 82 along with the poppet 84 while being compressed in the axial direction from the natural length at which the urging member 85 has no force in reserve. Thus, the poppet 84 is urged by the urging member 85 toward the check valve seat 83.

As shown in FIG. 2, the positioning member 86 is formed in an annular shape, has a male thread formed on the outer periphery, and is screwed to the female thread of the second mounting hole 23. A communication hole 97 passing through the positioning member 86 in the axial direction is formed in the positioning member 86. With the positioning member 86 mounted in the second mounting hole 23, the communication hole 97 is disposed coaxially with the filling channel 13. The filling channel 13 and the through-hole 32 of the supply-side joint 6 communicate with each other through the communication hole 97. The positioning member 86 is formed in such a size as not to protrude into the first mounting hole 22 when mounted in the second mounting hole 23. Mounted in the second mounting hole 23, the positioning member 86 presses the check valve seat 83 fitted in the enlarged part 81 against a step surface 98 between the enlarged part 81 and the valve housing part 82, and thereby defines (fixes) the position of the check valve seat 83 in the filling channel 13 (gas flow channel).

One example of reasons why the poppet 84 rotates (on its own axis) during the valve closing action will be described. As described above, the poppet 84 has the plurality of side holes 95 formed therein. To describe hole processing of the side holes 95, it should be understood that, in FIG. 5, the central axis O of the poppet 84 is disposed vertically to the sheet plane so as to coincide with the intersection of the one-dot chain lines disposed in a cross shape, and that the poppet 84 is viewed from the leading end side.

Figure 5:
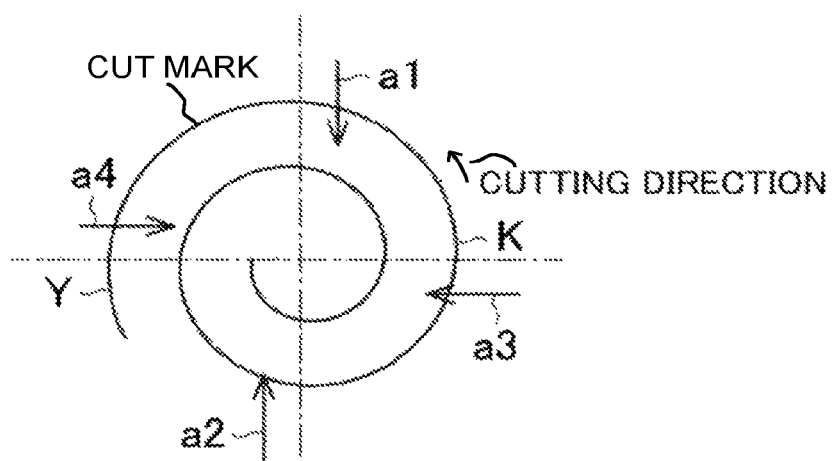
FIG. 5 is a view illustrating a direction in which the check valve (poppet) rotates when a force couple acts thereon.

In this state, the side holes 95 are formed in the poppet 84 by drilling. FIG. 5 shows an example in which four side holes 95 are formed. As indicated by the arrow a1 in FIG. 5, it is assumed that, when the side hole 95 is formed in the poppet 84 first, the position of hole processing is offset from the longitudinal line of the cross within the range of tolerance. In this case, upon completion of the drilling in the direction of the arrow a1, the poppet 84 is turned 90 degrees and the next side hole 95 is drilled, so that, as shown in FIG. 5, hole processing is performed at the position indicated by the arrow a3 that is offset within the range of tolerance as with the arrow a1. Subsequently, the other side holes 95 are formed in the same manner after turning the poppet 84 90 degrees each time, so that hole processing is performed at the positions as indicated by the arrows a2, a4 that are also offset within the range of tolerance.

Thus, it is a common practice, when forming a plurality of holes in the peripheral surface of an object in the circumferential direction, to turn the object by predetermined degrees before forming each hole. When the poppet 84 with the holes thus formed therein makes a valve closing action, an offset within the range of tolerance occurs in each of the side holes 95 processed at the positions indicated by the arrows a1, a3, a2, a4.

Accordingly, two forces (a force couple) having parallel lines of action and an equal magnitude and acting in the opposite directions are exerted by a fluid passing through the side holes 95 during the valve closing action (during the valve closing action, the fluid flows in directions 180 degrees opposite from the directions indicated by the arrows a1 to a4), which causes the poppet 84 to rotate. In the example of FIG. 5, the poppet 84 rotates in the clockwise direction when viewed from the leading end side.

While the example of four side holes 95 has been described above, the same description applies to other numbers of side holes as well, for example, two side holes 95. The example in which force couples are attributable to the tolerance in hole processing of the side holes 95 has been shown, but there are other causes of the rotation of the poppet than a force couple. That is, even when there is no force couple, the poppet may rotate during the valve closing action due to the shape of the poppet or the environment surrounding the poppet. In such cases, too, a valve device and a poppet that allow the durability of the valve device to be secured can be provided by forming a cut mark described below.

While the example in which the poppet 84 rotates during the valve closing action has been described, the poppet 84 rotates in the same direction during the valve opening action for the same reasons. However, this case is not relevant to the durability of the valve device.

Next, a method for forming the cut mark will be described. The poppet 84 is formed by a sintering process, and the tapered surface of the closure part that is brought into pressure contact with the seat surface 83a of the check valve seat 83 is subjected to a cutting process to secure the required dimensional accuracy. The term cut mark in this embodiment is a mark that is formed in the course of the cutting process.

To cut the tapered surface of the closure part 91 of the poppet 84, the rotation direction of the poppet 84 during the valve closing action is checked in advance. There are various methods for this check and the method is not limited, but one example is to confirm the rotation direction of the poppet 84 by sending a fluid, such as air, into a transparent pipe (e.g., acrylic-resin transparent pipe) with the poppet 84 placed inside the pipe.

After the rotation direction of the poppet 84 is confirmed, a cut mark is formed in the tapered surface of the closure part 91, in a spiral shape in the opposite direction from the rotation direction confirmed, by means of a cutting tool (single point tool) such as a lathe. The direction of the cut mark refers to the direction in which the spiral extends from the center toward the outside.

In the example of FIG. 5, since the poppet 84 rotates in the clockwise direction when viewed from the leading end side, a cut mark K should be formed in the direction of the spiral arrow Y shown in FIG. 5. That is, the cut mark K is formed in the tapered surface of the closure part 91 using a lathe etc. by means of a cutting tool (single point tool) of a type that traverses the inclined surface of the closure part 91. To form the cut mark K in a spiral shape, the poppet 84 is attached to the main spindle of the lathe, and with the poppet 84 being rotated in the counter-rotation direction that is opposite from the rotation direction shown in FIG. 4, the cutting tool, while traversing the tapered surface, is moved from the opposite side from the leading end toward the leading end in the shaft length direction of the poppet 84.

When the poppet 84 rotates in the opposite direction from the direction in the above example, the cut mark should be formed in the opposite direction from the direction in the above description. Next, the workings of the valve device 1 of this embodiment configured as has been described above will be described.

To fill the gas tank 2 with hydrogen gas, the supply pipe 5 is connected to the supply-side joint 6 and hydrogen gas is sent through the supply pipe 5. In this process, the built-in throttle valve of the supply-side joint 6 is opened under the pressure of the hydrogen gas, so that a large amount of hydrogen gas flows into the filling channel 13 through the communication hole 97 of the positioning member 86.

Figure 3:
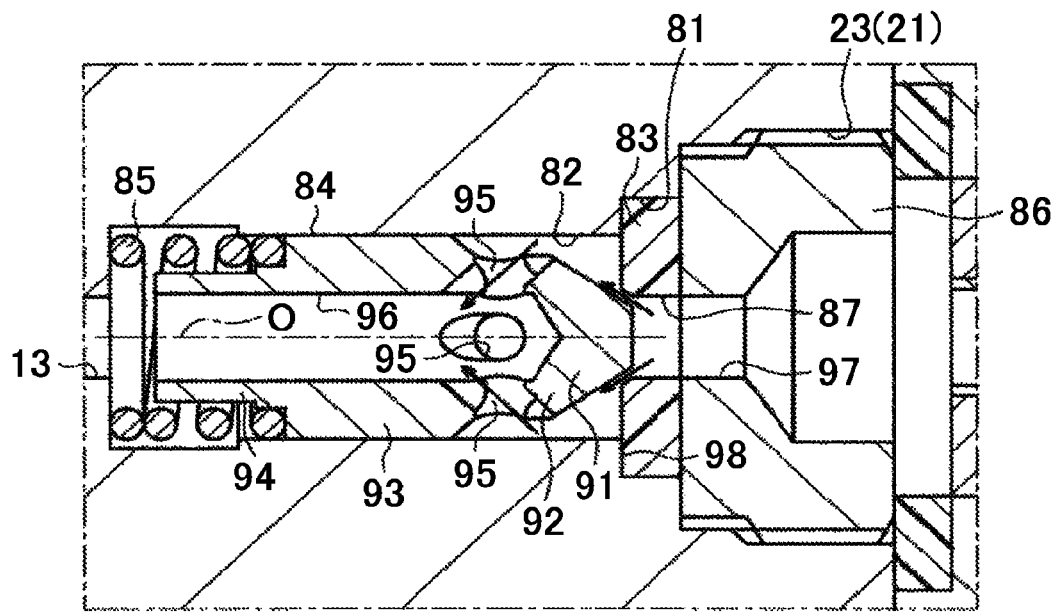
FIG. 3 is an enlarged sectional view showing the workings of a check valve.

Then, as shown in FIG. 3, under the pressure of the hydrogen gas, the poppet 84 of the check valve 16 moves toward the inside of the filling channel 13 against the urging force of the urging member 85 and separates from the check valve seat 83. In FIG. 3, the arrows indicate the flow direction of the hydrogen gas.

Thus, hydrogen gas flows into the valve housing part 82 and is introduced through the side holes 95 of the poppet 84 into the poppet 84. Since the side holes 95 are formed obliquely to the central axis O of the poppet 84 so as to extend along the direction in which the poppet 84 moves during the valve opening action and in which the gas flows, the gas streams introduced into the poppet 84 through the respective side holes 95 are smoothly merged. As a result, compared with the case where the central axes of the side holes 95 are perpendicular to the central axis O, the loss of dynamic pressure inside the poppet 84 is reduced as well as the fluctuation of the gas flow inside the poppet 84 being suppressed. The hydrogen gas having passed through the inside of the poppet 84 fills the gas tank 2 through the filling channel 13 and the connection channel 15.

Even when the load pushing the poppet 84 downward decreases as the gas flow rate decreases and the balance between that load and the restoring force of the urging member 85 is disrupted, the gas streams introduced through the respective side holes 95 into the poppet 84 are smoothly merged. Thus, the fluctuation of gas flow inside the poppet 84 is suppressed, so that the chattering of the poppet 84 is suppressed.

On the other hand, when the gas tank 2 is not to be filled with hydrogen gas, the poppet 84 seats itself on the check valve seat 83 by being urged toward the check valve seat 83 by the pressure of the hydrogen gas inside the gas tank 2 (filling channel 13) and the urging force of the urging member 85. Thus, the check valve port 87 of the check valve seat 83 is closed, and the hydrogen gas inside the gas tank 2 is prevented from being released to the outside of the body 4. The throttle valve (not shown) of the supply-side joint 6 is also closed.

Even in the closed state, the throttle valve does not completely shut off the flow of hydrogen gas, and functions as an excess flow valve that allows the passage of a slight amount of hydrogen gas. Therefore, when the poppet 84 of the check valve 16 is damaged, for example, a slight amount of hydrogen gas is released through the throttle valve to the outside, which allows a worker to detect abnormality of the valve device 1 (check valve 16).

Even when the poppet 84 seats itself on the seat surface 83*a* of the check valve seat 83 (see FIG. 6B) while rotating during the valve closing action, the cut mark cut in the opposite direction from the rotation direction comes into contact with the seat surface 83*a* of the check valve seat 83. Thus, the progress of wear of the check valve seat 83 having a lower hardness than that of the material of the closure part 91 can be suppressed.

Figure 12:
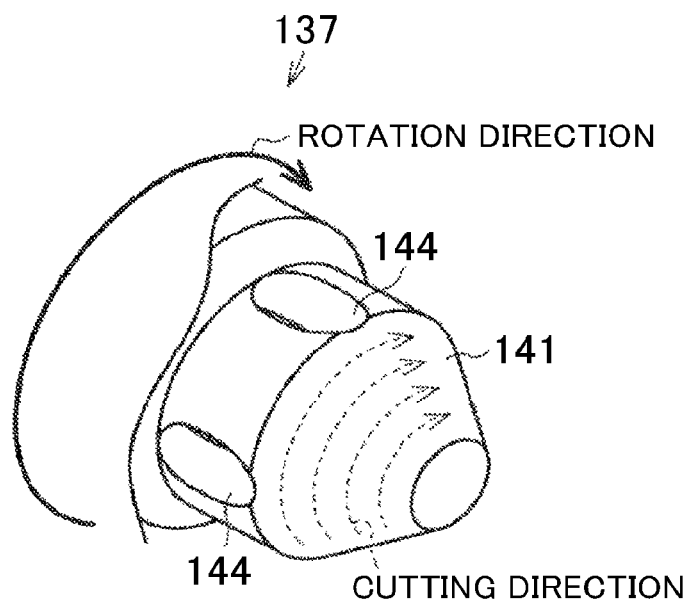
FIG. 12 is a perspective view of the check valve of FIG. 11.

Conventionally, the tapered surface is cut without the rotation direction of the poppet 84 taken into account. Accordingly, as shown in FIG. 12, when the rotation direction of the poppet 84 and the cutting direction of the cut mark in the tapered surface are the same, the seat surface is cut off by the cut mark as the poppet 84 rotates while seating itself. Thus, wear is promoted by the same principle as cutting a thread with a tap.

Figure 6A:
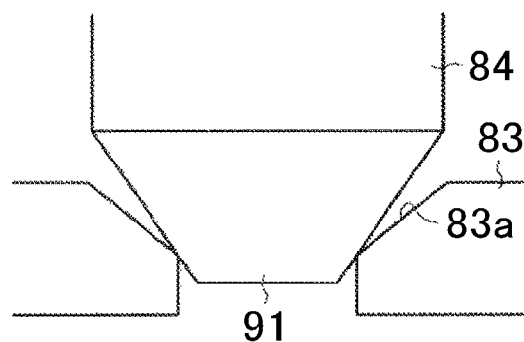
FIG. 6A is a view illustrating a closed state of the valve device at the initial stage of use.
Figure 6B:
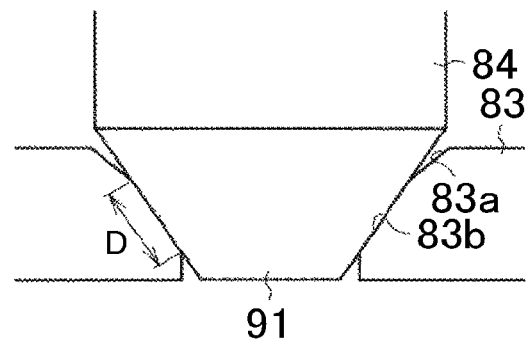
FIG. 6B is a view illustrating a closed state of the valve device when a seat surface of a valve seat has worn.

According to this embodiment, this situation can be avoided. FIG. 7 is a characteristic diagram showing the relation between the number of times of opening and closing of the check valve and a valve seat wear width. As shown in FIG. 6A, at an initial stage when the poppet 84 has been assembled, the tapered surface comes into line contact with the seat surface 83*a* of the check valve seat 83 when the valve is closed. When the wear of the seat surface 83*a* develops, as shown in FIG. 6B, an area 83*b* of the seat surface 83*a* in surface contact with the tapered surface increases due to the wear. The length (width) of contact in the shaft length direction of the poppet 84 is referred to as a valve seat wear width D.

In FIG. 7, the "conventional product" represents a poppet in which the side holes are formed only in directions perpendicular to the central axis O1. The "anti-noise product (oblique holes)" represents a poppet in which a cut mark is formed in the tapered surface in a direction that is different from the cutting direction of this embodiment and the same as the rotation direction. That is, the "anti-noise product (oblique holes)" is an example of the poppet that has the same side holes 95 as those of this embodiment and is different from this embodiment only in cutting direction of the cut mark. The "anti-noise product (oblique holes) with cutting direction changed" is an example of this embodiment.

As shown in FIG. 7, in the case of the example of this embodiment, the valve seat wear width increased to a constant value, but after reaching the constant value, maintained that value even when the number of times of opening and closing of the check valve increased. By contrast, in the case of the "anti-noise product (oblique holes)", of which only the cutting direction is different from that of this embodiment, even after exceeding the constant value, the valve seat wear width increased as the number of times of opening and closing of the check valve increased. Although the valve seat wear width of the "conventional product" maintained a value smaller than the constant value of the "anti-noise product (oblique holes) with cutting direction changed", even when the number of times of opening and closing of the check valve increased, the conventional product has a problem in that no measures are taken against noise.

Figure 8:
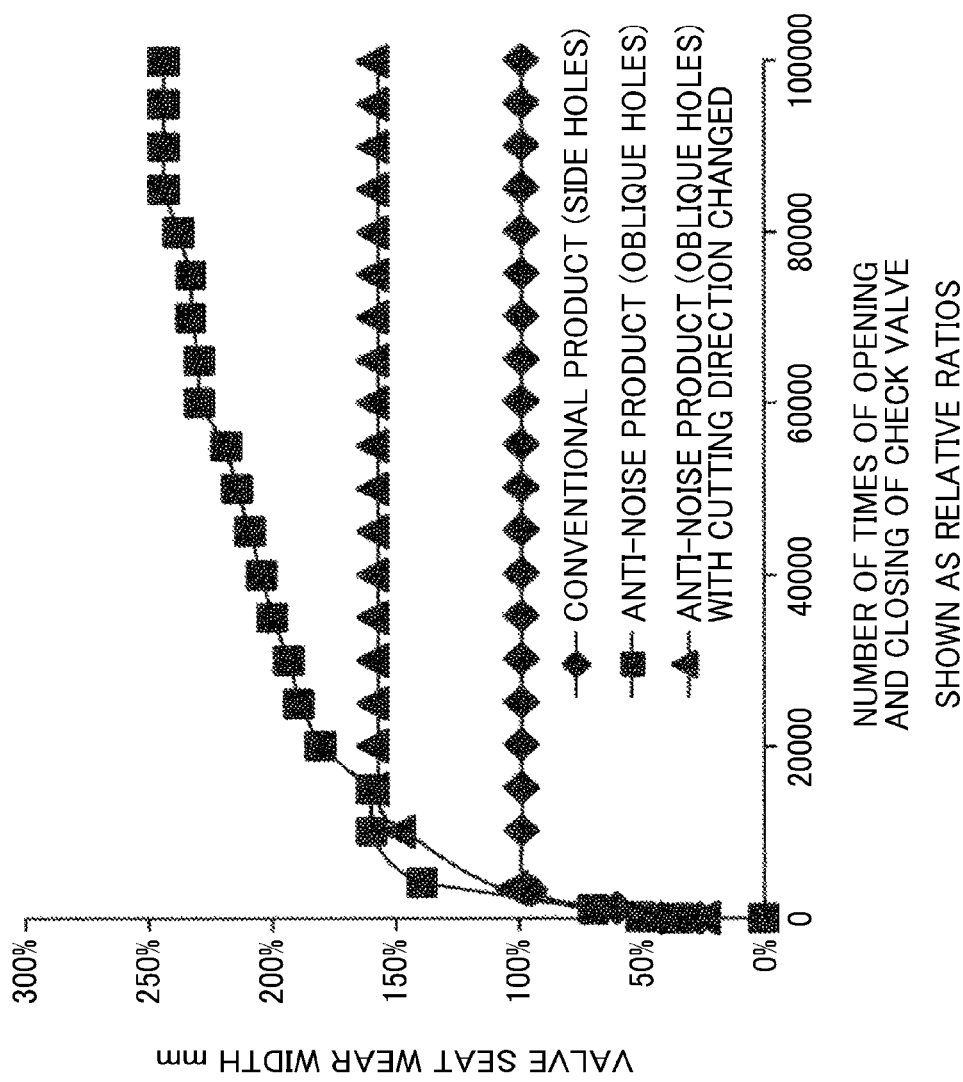
FIG. 8 is a characteristic diagram showing the relation between the number of times of opening and closing of the check valve and a valve seat wear ratio.
Figure 9:
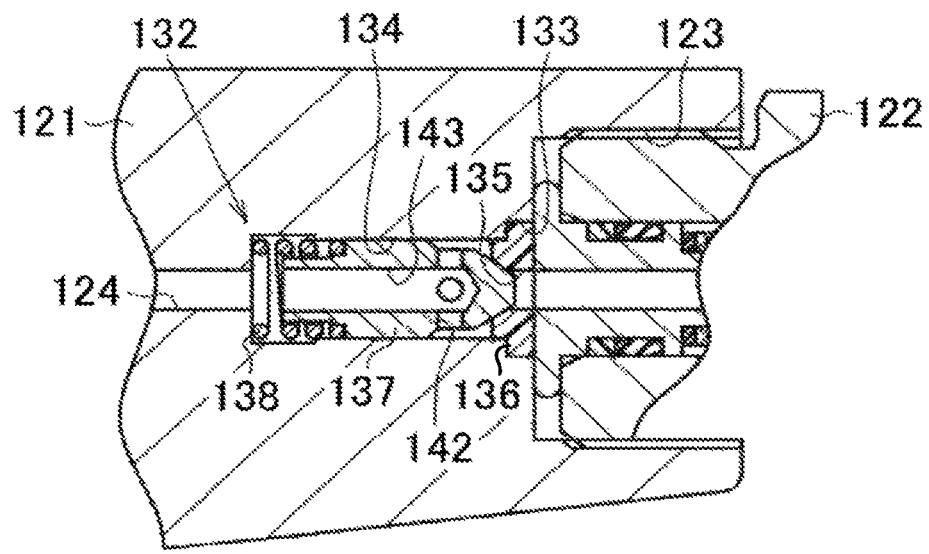
FIG. 9 is a sectional view of a conventional valve device.
Figure 10:
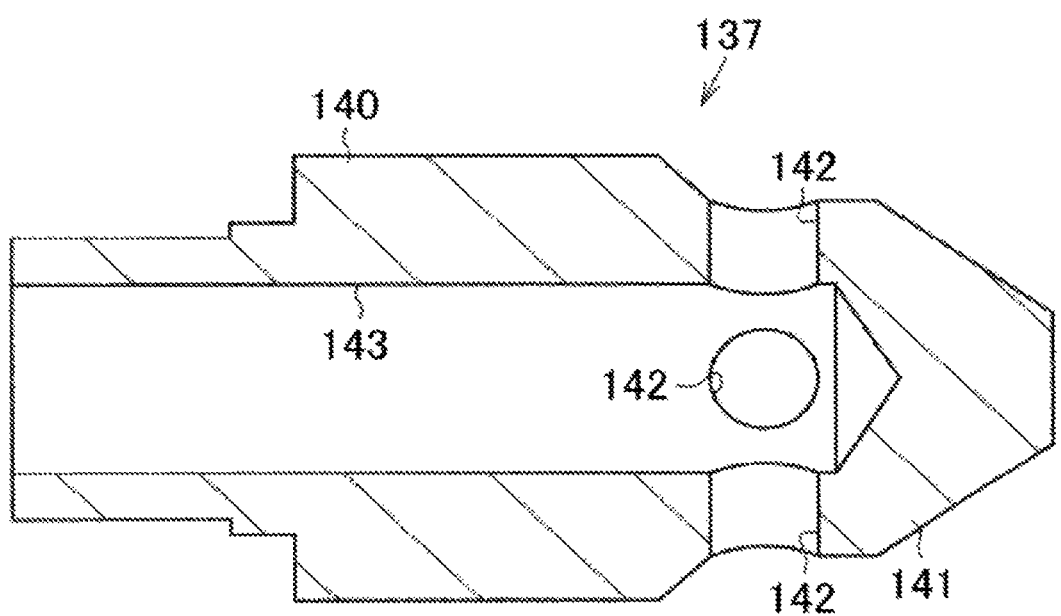
FIG. 10 is a sectional view of a check valve in the valve device of FIG. 9.
Figure 11:
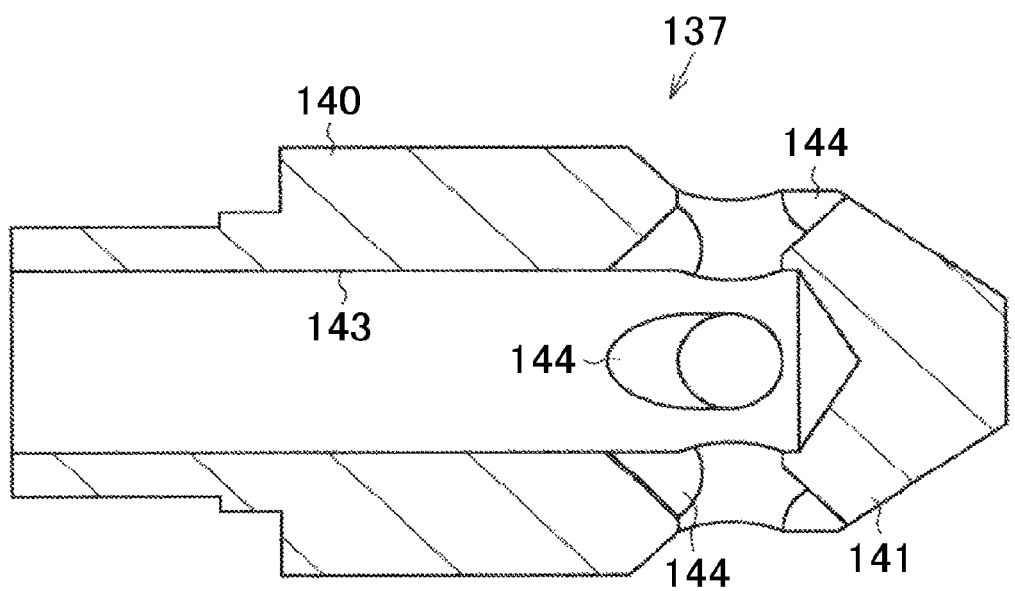
FIG. 11 is a sectional view of another conventional check valve.

FIG. 8 is a characteristic diagram of a valve seat wear ratio and the number of times of opening and closing of the check valve. Using the same data as FIG. 7, FIG. 8 shows the ratios of the valve seat wear widths of the "anti-noise product (oblique holes)" and the "anti-noise product (oblique holes) with cutting direction changed" as the valve seat wear ratios with reference to the value at which the valve seat wear width of the "conventional product" became constant.

As shown in FIG. 8, in the case of the "anti-noise product (oblique holes)", when the number of times of opening and closing increased, the ratio increased up to about 250%. By contrast, in the case of the "anti-noise product (oblique holes) with cutting direction changed", which is the example of this embodiment, the ratio was maintained at a constant ratio above 150%.

Next, the effects of this embodiment will be described. (1) In the valve device 1 and the poppet 84 of this embodiment, the hardness of the closure part 91 of the poppet 84 is higher than that of the check valve seat 83, and the cut mark of the opposite direction from the rotation direction around the shaft center is provided in the peripheral surface of the closure part 91. Thus, an effect is achieved that the durability of the valve device can be secured even when the poppet rotates around the shaft center thereof.

That is, even when the poppet rotates around the shaft center thereof, the cut mark of the opposite direction from the rotation direction comes into contact with the seat surface of the valve seat. Thus, the wear of the check valve seat having a lower hardness is reduced, and the durability of the valve device can be secured.

(2) In the valve device 1 and the poppet of this embodiment, the side holes 95 of the poppet 84 are oblique holes oblique to the central axis (shaft center) O. Thus, even when the poppet has side holes that are oblique to the shaft center of the poppet, the wear of the check valve seat having a lower hardness is reduced and the durability of the valve device can be secured.

(3) The poppet 84 of the valve device 1 of this embodiment has the plurality of side holes 95, and is configured such that a force couple is exerted by a fluid flowing through the side holes 95. Thus, even when the poppet is configured such that a force couple is exerted by a fluid flowing through the plurality of side holes, the wear of the check valve seat having a lower hardness is reduced and the durability of the valve device can be secured.

The embodiment of the present invention is not limited to the above embodiment but may be modified as follows. In the above embodiment, the side holes 95 of the poppet 84 are formed by first boring the hole perpendicular to the central axis O of the poppet 84 in the small-diameter tubular part 92 of the poppet 84, and then boring the oblique holes intersecting with the perpendicular hole.

Instead of such double boring, i.e., by omitting the boring of the perpendicular hole, oblique holes of which the central axes O1 intersect obliquely with the central axis O of the poppet 84 may be formed in the small-diameter tubular part 92 of the poppet 84 to form the side holes 95.

Alternatively, the side holes 95 may be right side holes that are perpendicular to the central axis O of the poppet 84. In this case, although the poppet 84 is not an anti-noise product, the amount of wear of the check valve seat 83 can be reduced.

The hardness of the closure part 91 of the poppet 84 is higher than that of the check valve seat 83 in the above embodiment, but the hardness of the check valve seat 83 may be higher than the hardness of the closure part 91. In this case, if the cut mark K is formed in the seat surface 83a of the check valve seat 83 in the cutting direction shown in FIG. 13 and if the poppet 84 rotates in the direction of the arrow Y, the wear of the closure part 91 of the poppet 84 having a lower hardness is reduced.

Figure 4:
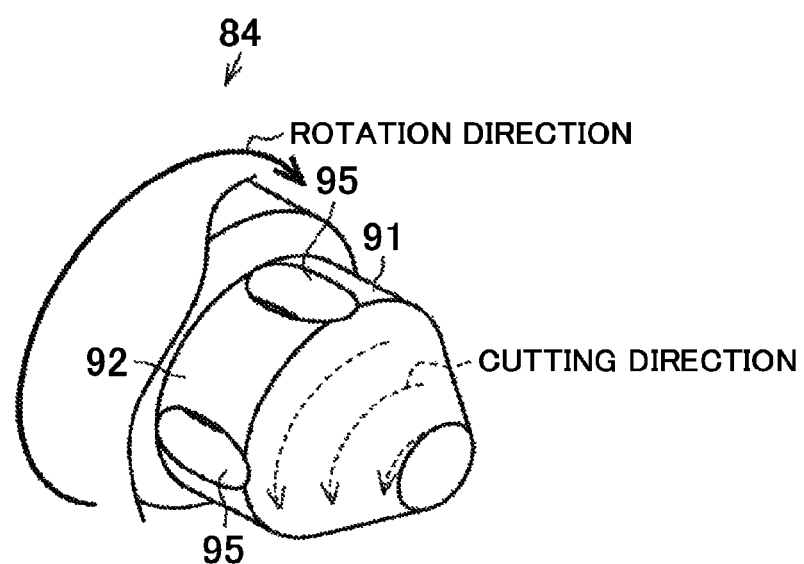
FIG. 4 is a perspective view of the check valve (poppet)
Figure 13:
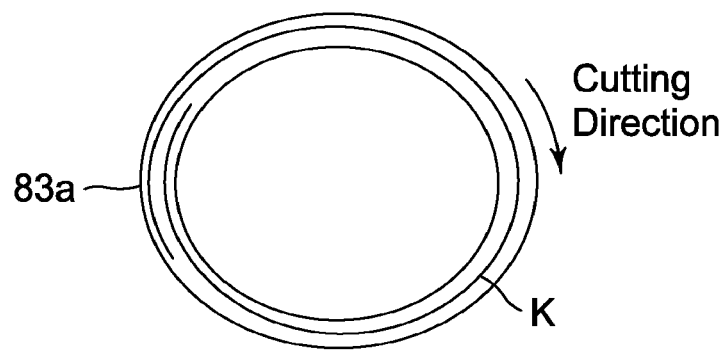
FIG. 13 shows a cut mark in a check valve according to an embodiment of the invention.

That is, when the poppet 84 rotates in the clockwise direction as viewed from the leading end side as shown in FIG. 4, the cut mark K should be formed in the seat surface 83a of the check valve seat 83 in the cutting direction shown in FIG. 13, i.e., in the clockwise direction. In FIG. 13, the direction of the cut mark refers to the direction in which the spiral from the outside toward the center.

What is claimed is:

1. A valve device comprising:
    a poppet that is formed in a hollow shaft shape except for a leading end, has a tapered closure part at the leading end and a side hole passing through a wall of the hollow shaft-shaped part, the poppet is configured to rotate in a first direction around a shaft center thereof during opening and closing actions; and
    a valve seat having a sloped seat surface with which the closure part of the poppet comes into contact when closing the valve device,
    wherein the closure part of the poppet or the seat surface of the valve seat, whichever has a higher hardness, has a spiral cut mark formed in a surface thereof in a second direction which is an opposite direction from the first direction of rotation of the poppet around the shaft center that occurs during the valve closing action.

2. The valve device according to claim 1, wherein the side hole is either a right side hole perpendicular to the shaft center or an oblique hole oblique to the shaft center.

3. The valve device according to claim 2, wherein the oblique hole is composed of a first hole perpendicular to the shaft center, and a second oblique hole that intersects with the first hole and inclines toward the closure part while extending toward an outer periphery of the poppet.

4. The valve device according to claim 1, wherein the poppet has two side holes, and is configured such that a force couple is exerted by a fluid flowing through the two side holes.

5. A poppet that is formed in a hollow shaft shape except for a leading end, has a sloped surface at the leading end and a side hole passing through a wall of the hollow shaft-shaped part, and rotates in a first direction around a shaft center thereof when there is a fluid flowing through the side hole, the poppet comprising, in the sloped surface, a spiral cut mark formed in a second direction which is an opposite direction from the first direction of rotation of the poppet around the shaft center that occurs when the poppet moves in a direction toward the leading end.

6. The poppet according to claim 5, wherein the side hole is either a right side hole perpendicular to the shaft center or an oblique hole oblique to the shaft center.

7. The poppet according to claim 6, wherein the oblique hole is composed of a first hole perpendicular to the shaft center, and a second oblique hole that intersects with the first hole and inclines toward the leading end while extending toward an outer periphery of the poppet.

8. The poppet according to claim 5, wherein the poppet has the two side holes formed therein, and is configured such that a force couple is exerted by a fluid flowing through the two side holes.

* * * * *